Feb. 20, 1934.   H. E. FRITZ   1,948,211
FLEXIBLE SEALING COUPLING
Filed Sept. 17, 1932
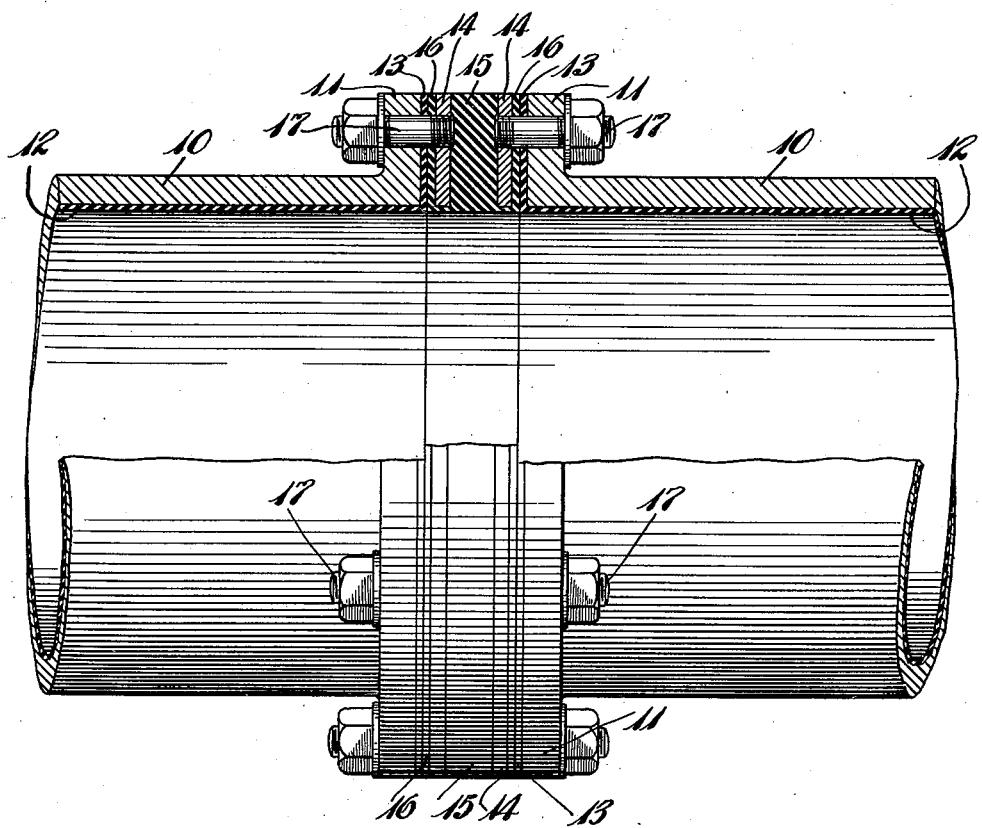
Inventor
Howard E. Fritz
By Eakin & Avery
Attys- Patented Feb. 20, 1934

1,948,211

UNITED STATES PATENT OFFICE 1,948,211

FLEXIBLE SEALING COUPLING

Howard E. Fritz, Akron, Ohio, assignor to The B. F. Goodrich Company, New York, N. Y., a corporation of New York Application September 17, 1932
Serial No. 633,579

5 Claims. (Cl. 285—90)

This invention relates to flexible sealing couplings for conduit sections.

The chief objects of the invention are to provide compactness and strength of the coupling structure, to provide convenience of assembly, to provide a conduit coupling that will effectively cushion vibration, such as is caused by flow pulsations of the conducted fluid or by vibrating machinery, to provide yieldability of the coupling for expansion or contraction of the conduit section due to temperature changes, and to provide in such a coupling a good fluid seal, a minimum of resistance to flow, and effective protection against corrosion and abrasion.

These and further objects will be apparent from the following description, reference being had to the accompanying drawing, in which the figure is an elevation, with parts broken away and sectioned, of a pair of conduit sections joined by a coupling constructed according to and embodying the invention in its preferred form.

The illustrated structure comprises two pipe sections 10, 10 provided with end flanges 11, 11 and, desirably, corrosion resisting linings 12, 12 of rubber composition having end portions 13, 13 extending onto the flange faces. Interposed between the two lining portions 13, 13 of the respective conduit flanges is a flexible sealing structure comprising a pair of annular plate elements 14, 14 held in axially spaced relation by an annular body of yieldable material 15. The material 15, preferably of resilient rubber composition, extends over the inner peripheries of the annular plates 14, 14 and onto their outer faces at 16, 16 to provide a smooth interior of the coupling flush with the inner walls of the conduit linings, to provide a good seal at the linings 13, 13 of the conduit flanges, and to prevent contact of the fluid with any of the metallic parts.

For securing the sealing structure to the conduit flanges in sealing relation thereto without, however, hampering the material 15 in its function of cushioning vibrations and other relative movements of the conduit sections, clamping devices are provided comprising preferably peripherally spaced bolts 17, 17 extending through aligned apertures in each plate 14 and adjacent conduit flange and being effective, as by means of nuts as shown, to clamp the rubber elements 16 and 13 between the plate and coupling flange. The bolts 17 may be in the form of studs threaded into the plates 14, as shown, for facility of manufacture, and the studs are preferably welded to the plates with but a small part, if any, of the studs lying within the cushion 15, so that the latter may be the more effective to cushion vibrations in all directions.

The rubber 15 is preferably secured to the plate elements by surface adhesion, preferably vulcanized adhesion, by which a joint of considerable resistance to separation may be provided, especially with ample radial dimensions of the plate surfaces and rubber, which is permitted by the construction herein described, without constriction of the fluid passage and without undue bulk of the coupling.

The sealing structure, including the rubber elements 15 and 16, the plates 14 and the bolts 17, may be manufactured and handled as a unit structure, and the operations of assembly and disassembly with the flanged coupling sections may thus be effected with convenience.

Variations may be resorted to without departing from the scope of the invention as it is defined in the following claims:

I claim:

1. A flexible coupling assembly comprising, in combination, a pair of conduit sections, a cushioning structure comprising an annular cushioning body disposed between the opposed ends of said sections, a pair of axially spaced annular members secured at their opposed faces in tension-resisting relation to said cushioning body, sealing elements disposed between the annular members and the respective conduit sections, and means for securing the members axially against the sealing elements at the respective ends of the conduit sections in sealing relation thereto, said securing means permitting the said body to cushion relative movement of the sections.

2. A coupling assembly as defined in claim 1 in which the annular cushioning body is of resilient rubber composition and is vulcanized to the said members.

3. A coupling assembly as defined in claim 1 in which the means for securing the members to the conduit sections comprises peripherally spaced elements extending axially from the members for engagement with their respective sections.

4. A flexible coupling assembly comprising, in combination, a pair of conduit sections, a pair of axially spaced annular members disposed between the opposed ends of said sections, an annular rubber cushion disposed between said members and secured thereto, the rubber of the cushion extending over the inner peripheries and onto the outer faces of the members, and means for clamping the members to the respective sections with the rubber on the outer faces of the members held in sealing relation therebetween.

5. A flexible coupling assembly comprising, in combination, a pair of lined conduit sections having end flanges onto which the lining extends, a pair of axially spaced annular members disposed between the opposed ends of said sections, an annular rubber cushion disposed between said members and secured thereto, the rubber of the cushion extending over the inner peripheries and onto the outer faces of said members, and means for clamping the members to the respective sections with the lining of each flange and the rubber on the outer face of each member held in sealing relation between the member and flange.

HOWARD E. FRITZ.